United States Patent [19]

Obitsu et al.

[11] Patent Number: 4,985,229

[45] Date of Patent: Jan. 15, 1991

[54] PROCESS FOR MANUFACTURING FINE ZIRCONIUM OXIDE POWDER

[75] Inventors: Masamichi Obitsu, Funabashi; Isao Tomi, Chiba; Takao Kaga, Funabashi, all of Japan

[73] Assignee: Nissan Chemical Industries, Ltd., Tokyo, Japan

[21] Appl. No.: 100,723

[22] Filed: Sep. 25, 1987

[30] Foreign Application Priority Data

Sep. 27, 1986 [JP]  Japan ................................ 61-229102

[51] Int. Cl.$^5$ .............................................. C01G 25/02
[52] U.S. Cl. ................................................... 423/608
[58] Field of Search ....................... 423/608, 266, 275; 501/104, 103, 12; 502/8

[56] References Cited

U.S. PATENT DOCUMENTS

| | | | |
|---|---|---|---|
| 2,984,576 | 5/1961 | Alexander et al. | 501/103 |
| 4,365,011 | 12/1982 | Bernard et al. | 501/103 |
| 4,619,817 | 10/1986 | Stambaugh et al. | 423/608 |
| 4,664,894 | 5/1987 | Suzuki et al. | 423/608 |
| 4,722,833 | 2/1988 | Kato | 423/608 |
| 4,788,045 | 11/1988 | Colombet et al. | 423/266 |

FOREIGN PATENT DOCUMENTS

| | | |
|---|---|---|
| 0194191 | 9/1986 | European Pat. Off. . |
| 0262579 | 4/1988 | European Pat. Off. . |
| 58-217430 | 12/1983 | Japan . |
| 59-78928 | 5/1984 | Japan . |
| 61-191520 | 8/1986 | Japan . |

OTHER PUBLICATIONS

Grant, Julius, "Hackh's Chemical Dictionary", 4th Ed. p. 622.

Handbook of Chemistry and Physics, 44th Ed, Hodgman, The Chemical Rubber Publishing Co. Ohio, 1962, pp. 518,519, 600, 601, 552, 553, 682, 683.

*Primary Examiner*—Melvyn J. Andrews
*Attorney, Agent, or Firm*—Birch, Stewart, Kolasch & Birch

[57] ABSTRACT

A process for manufacturing fine zirconium oxide powder comprises adding a hydroxide of at least one metal selected from calcium, magnesium, yttrium and a lanthanide series element to a zirconia sol, which is dehydrated, dried and calcined. A zirconia sol prepared by hydrolyzing under heating an aqueous solution containing a zirconium salt, zirconium hydroxide or zirconia hydrate and then filtering the hydrolized aqueous solution through a ultra-filtration membrane is preferably used.

9 Claims, No Drawings

PROCESS FOR MANUFACTURING FINE ZIRCONIUM OXIDE POWDER

BACKGROUND OF THE INVENTION

1. Field of the Invention

The present invention concerns a process for manufacturing fine zirconium oxide powder suitably used as the starting material for zirconia type ceramics.

2. Description of the Prior Art

As the manufacturing method for fine zirconium oxide powder, there is known a method of neutralizing an aqueous solution containing a water-soluble zirconium salt such as zirconium nitrate, zirconium sulfate and zirconium oxychloride with an aqueous ammonia or the like to form a hydroxide sol of zirconium, filtering and water washing the precipitate, followed by drying and calcining, or a method of heating to hydrolyze an aqueous solution of a water-soluble zirconium salt thereby forming a sol, followed by drying and calcining.

In this case, it has been recommended to incorporate an oxide of calcium, magnesium, yttrium or a lanthanide series element such as cerium as a stabilizer in the fine zirconium oxide powder, and such a stabilizer has been incorporated into the zirconium oxide by adding the salt of the above-mentioned metal to an aqueous solution of a water-soluble zirconium salt, or adding an oxide of the above-mentioned metal or the salt thereof at the step of calcining.

The fine zirconium oxide powder thus obtained can be sintered and used as zirconia type ceramics. However, the powder obtained by the conventional method as described above by preparing a sol of hydroxide or oxide followed by drying has a drawback in that coagulated particles are difficult to be disintegrated and can not easily be formed into fine powder and, accordingly, it has a significant effect on moldability and sinterability when it is used as starting material for ceramics failing to obtain a satisfactory sintering product. While it is necessary to uniformly disperse and solid-solubilize the stabilizer for obtaining a stabilized zirconia sintering product, the known method is not completely satisfactory in this regard.

Although there have been proposed, for satisfying the requirement for the zirconium oxide as the starting material for ceramics, a method of minimizing the amount of a hydroxide in the hydrolysis product (Japanese patent Laid-Open No. Sho 58-79818), a method of using an organic solvent for preventing the coagulation upon drying (Japanese patent Publication No. Sho 54-25523), a method of using a spray drier for drying an aqueous solution comprising a zirconium salt alone, or a zirconium salt and at least one salt selected from magnesium, calcium and a metal element having three or higher atomic valency (Japanese patent Laid-Open No. Sho 60-86025), and a method of growing sol particles (Japanese patent Laid-Open No. Sho 61-97134), etc., these methods are not always satisfactory at present.

SUMMARY OF THE INVENTION

It is, accordingly, the object of the present invention to provide a method of manufacturing fine zirconium oxide which is less coagulative and easily disintegratable if coagulated and simply powderized and, therefore, capable of obtaining a sintering product at high density upon sintering.

The present inventors have made an earnest study for dissolving the foregoing problems and, as a result, have found that a solution of a uniform composition can be obtained while avoiding coagulation, viscosity increase and gelation of sols by adding a hydroxide of calcium, magnesium, yttrium or a lanthanide series element such as cerium to a zirconia sol so that a starting zirconia powder providing high density sintering product can be obtained stably by applying a dehydrating heat treatment to the uniform solution. In addition, the present inventors have also considered that an intense coagulation formed in the dehydrating heat treatment of the zirconia sol is caused by the presence of unreacted product, not yet grown zirconium hydroxide and zirconia hydrate and, further, coexistent salts, etc., and have found that a starting zirconium oxide powder capable of providing a high density sintering product can be obtained stably, by removing the unreacted products, not yet grown zirconium hydroxide and zirconia hydrate and, further, coexistent salt and acid by way of ultra-filtration membrane from a reaction solution resulted from the heating hydrolysis of an aqueous solution of zirconium salt or an aqueous solution containing zirconium hydroxide or zirconia hydrate while stably maintaining the reaction solution, thereby obtaining a zirconia sol and, thereafter, applying dehydrating heat treatment.

Specifically, the method according to the present invention relates to a method for manufacturing fine zirconium oxide powder from a zirconia sol by dehydration, drying and calcining, wherein a hydroxide of at least one metal selected from calcium, magnesium, yttrium or a lanthanide series element such as cerium is added to the zirconia sol.

In this case a zirconia sol obtained by the convention method can be used. However, a suitable embodiment for practicing the manufacturing method according to the present invention is to use a zirconia sol prepared by hydrolyzing under heating an aqueous solution of a zirconium salt, zirconium hydroxide or zirconia hydrate and then filtering the aqueous solution thus hydrolyzed by way of a ultra-filtration membrane.

The present invention also provides a method for producing fine zirconium oxide powder comprising hydrolyzing under heating an aqueous solution containing a zirconium salt, zirconium hydroxide or zirconia hydrate, filtering the hydrolyzed aqueous solution by way of a ultra-filtration membrane to obtain a zirconia sol and then dehydrating, drying and calcining the sol.

In this method, addition of the stabilizer is not always necessary. In the case of adding the stabilizer, it is most recommendable to add a hydroxide of the metal mentioned above to the zirconia sol as described above, but it may be preferably employed such a method of adding a salt of at least one metal selected from calcium, magnesium, yttrium or lanthanide series elements such as cerium to the zirconia sol or a method of adding an oxide, hydroxide or salt of at least one metal selected from calcium, magnesium, yttrium or a lanthanide series element such as cerium to the zirconia powder at the calcining stage.

By any of the methods according to the present invention as described above, fine zirconium oxide powder less coagulative and easily disintegratable, if coagulated, can be obtained. Accordingly, when sintering them, a sintering product at high density (greater than 98& of theoretical density) and with high strength can be obtained, as well as a satisfactory sintering product in which the stabilizer is uniformly dispersed and solid solubilized in the sintering product can be obtained.

The foregoing and other objects, features and advantages of the present invention will become apparent by reading the following descriptions.

PREFERRED EMBODIMENT OF THE INVENTION

According to the manufacturing method of the present invention, fine zirconium oxide powder is obtained by dehydrating, drying and calcining a zirconia sol.

Those zirconia sols obtained by known methods can be used in the present invention and the preferred zirconia sol is one obtained by hydrolyzing under heating an aqueous solution containing a zirconium salt, zirconium hydroxide or zirconia hydrate and then filtering the thus hydrolyzed aqueous solution by way of a ultra-filtration membrane.

As the zirconium salt, there can be mentioned zirconium nitrate, zirconium sulfate, zirconium oxychloride, zirconium acetate, etc., alone or in combination of two or more of them.

Further, preferred aqueous solution containing the zirconium hydroxide is an aqueous solution containing a zirconium hydroxide obtained by neutralizing an aqueous solution of zirconium nitrate, zirconium sulfate, zirconium oxychloride or zirconium acetate. A preferred aqueous solution containing a zirconia hydrate is an aqueous solution containing a zirconia hydrate obtained by hydrolyzing under heating an aqueous solution of zirconium nitrate, zirconium sulfate, zirconium oxychloride or zirconium acetate is suitable.

For the neutralizing condition in the case of obtaining the zirconium hydroxide in the above-mentioned method, a method of neutralizing the aqueous solution described above at a concentration of 0.1–5 mol/l as zirconia with an aqueous ammonium solution is preferred. Further, as the conditions for hydrolysis under heating for obtaining the zirconia hydrate, those hydrolyzing the aqueous solution of the zirconium salt at a concentration of 0.1–5 mol/l as zirconia at a temperature from 20 to 300° C. for 30 minutes to 10 days under heating are preferably used.

In the case of hydrolyzing under heating an aqueous solution containing the zirconium salt, zirconium hydroxide or zirconia hydrate described above, the amount of zirconium in the aqueous solution as $ZrO_2$ is from 0.1 to 5 mol/l and, preferably, from 0.3 to 3 mol/l. Although there are no particular restrictions for the condition of the hydrolysis under heating, an aqueous solution of a zirconium salt or an aqueous solution containing zirconium hydroxide or zirconia hydrate within a range of such a zirconia concentration may be hydrolyzed under heating preferably at a temperature from 20 to 300° C. for from 30 minutes to 10 days and, more preferably, at a temperature from 70 to 250° C. for one hour to 4 days. Particles of the zirconia hydrate or the zirconium hydroxide are grown by such a reaction.

The hydrolyzed solution under heating obtained in this way is preferably treated with ultra-filtration. By the treatment, unreacted products, not-yet grown zirconium hydroxide and zirconia hydrate, as well as coexistent salt and acid are removed, and satisfactory fine zirconium oxide powder can be obtained by using the zirconia sol obtained by the ultra-filtration without adding metal hydroxide or metal salt as described later. The ultra-filtration membrane used for the ultra-filtration preferably has a fractional molecular weight from 500 to 300,000. If the fractional molecular weight is greater than 300,000, capturing of the colloidal particles at the membrane is poor to reduce the yield. If the fractional molecular weight is less than 500, there is no effect intended for removing not yet grown particles and the filtration efficiency is reduced. In the ultra-filtration method, the sol can be purified without forming coagulation of particles by repeating the procedures of circulating the resultant solution from the hydrolysis under heating, for example, through a tubular type or hollow fiber type ultra-filtration device while compensating purified water in the same amount with the liquid filtrate discharged through the filtration membrane till the amount of purified water supplied reaches from 5 to 50 times of the thermally hydrolyzed solution to be treated. By the treatment, the pH of the sol can be adjusted to 3 to 5.

The particle size of the zirconia in the zirconia sol is preferably within a range from 500 Å to 5000 Å. A sintering product at a higher density and excellent strength can be obtained by sintering the zirconia powder obtained from the sol comprising the zirconia of the particle size in the above-mentioned range. If the particle size of zirconia is less than 500 Å, it is not desirable since dried powder tends to show increased coagulative nature. On the other hand, if it exceeds 5000 Å, no stable zirconia sol can be obtained.

In the present invention, a hydroxide of one or more of metals selected from calcium, magnesium, yttrium or a lanthanide series element such as cerium is added to a zirconia sol, in which the hydroxide, different from the case of adding the salt of the metal, is well dispersed in the zirconia sol causing neither coagulation sol nor viscosity increase accompanying therewith. It should be noted that the metal hydroxide may be added to the zirconia sol obtained by the conventional method in which the above-said ultra-filtration treatment is not conducted, although, it is the best may to add the metal hydroxide to the zirconia sol obtained through the ultra-filtration according to the above-described process.

The amount of the hydroxide added is preferably from 0.1 to 30 mol% and, more preferably from 0.1 to 10 mol% as the oxide in stabilized zirconia.

The zirconia sol in which the stabilizer is dispersed obtained in this way is applied with dehydration, drying and calcining treatment by the usual method. For instance, the dehydrating method can include, for example, a method of concentrating the sol by removing water through distillation under a reduced pressure, adding an organic solvent such as alcohol, for example, methanol, ethanol and propanol or acetone to a concentrated product to replace the solvent for applying dehydration and then removing solvent, or a method of obtaining dried powder directly by a spray drier. Further, the calcining can usually be conducted under the condition at a temperature from 700 to 1200° C. for from 10 minutes to 24 hours and, preferably, at a temperature 800 to 1100° C. for from 30 minutes to 12 hours.

The zirconia sol obtained through the ultra-filtration as described above can be formed into fine zirconium oxide powder by dehydration drying and calcining with or without adding a stabilizing salt or hydroxide. In this case, it is most preferred to use the hydroxide of the metal as described above for the stabilizer and adding it to the sol after the ultra-filtration. However, depending on the case, the salt of the metal as defined above may be added to the sol after ultra-filtration, or the oxide, hydroxide or salt of the metal may be added to the zirconia powder in the step of the calcining. The addition amount can be from 0.1 to 30 mol% and, more preferably, from 0.1 to 10 mol% as the oxide in the stabilized zirconia. It should be noted that the metal salt includes sulfates, chlorides, oxychlorides, nitrates and acetates of the metal.

The fine zirconium oxide powder obtained by the method according to the present invention can be sintered into a sintering product by the customarily employed method. In this case, pulverization may be applied if necessary prior to the sintering and the fine powder obtained according to the present invention can easily be disintegrated by pulverization even if it is coagulated. For the sintering, the temperature can be at about 1200–1600° C. and, particularly, 1300–1500° C. Further, the sintering time can be from 30 minutes to 40 hours.

The present invention will now be described more specifically referring to example but it should be noted that the invention is no way restricted only thereto.

EXAMPLE 1

An aqueous solution at a zirconium concentration of 1 mol/l was prepared by using a special grade reagent of zirconium oxychloride ($ZrOCl_2.8H_2O$) and purified water.

Hydrolysis was applied to the solution by heating at 130° C. for 8 hours. The resultant solution was sol-like and the average particle size for the particle measured by the photon correlation spectroscopy was 640 Å.

The liquid was circulated by using a tubular type ultra-filtration device using a ultra-filtrating membrane having a fractional molecular weight of 15,000 while compensating purified water in the same amount as that of the filtrate. When the liquid filtrate at the initial stage was sampled and neutralized with an aqueous ammonia, white precipitation containing zirconium was deposited. The liquid filtrate, after repeating circulation and when the amount of purified water supplied reached ten times of the initial liquid filtrate, had a pH value of 3.9 and an electroconductivity of 1.83 (mS/cm) and the liquid filtrate did not become cloudy white if it was neutralized with aqueous ammonia. The average particle size of the resultant sol measured by the photon correlation spectro scopy was 670 Å and it was supposed that fine particle portion was removed.

Yttrium hydroxide was added by 3 mol% as yttria to the thus resultant sol and the sol was concentrated and adjusted to the zirconia concentration at 30% by weight. The sol was dried by using a spray drier and the resultant powder was calcined at 950° C. for 2 hours. Purified water was added by about twice by weight ratio to the calcined powder to make a slurry, which was pulverized in a wet process by a ball mill for 4 hours and then dried by an evaporator.

The thus obtained fine zirconia powder was molded in a mold press and a cold isostatic press and then sintered at 1450° C. for 2 hours. The resultant sintering product had a density of 6.04 g/cm$^3$ and a bending strength of 105 kgf/mm$^2$.

EXAMPLE 2

An aqueous solution at a zirconium concentration of 0.4 mol/l was prepared by using a special grade reagent of zirconium oxychloride ($ZrOCl_2.8H_2O$) and purified water.

Hydrolysis was applied to the solution by heating at 130° C. for 8 hours. The resultant solution was sol-like and the average particle size for the particles measured by the photon correlation spectroscopy was 1800 Å.

The liquid was applied with ultra-filtration and washing by the same procedures as in Example 1 to obtain a sol having a zirconia concentration at 30%, pH at 3.7 and an electroconductivity of 1.76 (mS/cm).

Yttrium hydroxide was added to the sol by 3 mol% as yttria and then dried, calcined, pulverized in the wet process and dried in the same manner as in Example 1 to obtain fine zirconia powder.

The resultant powder was molded in the same manner as in Example 1 and sintered. The resultant sintering product had a density of 6.07 g/cm$^3$ and a bending strength of 107 kgf/mm$^2$.

EXAMPLE 3

An aqueous 25% ammonia solution was added for neutralization to a solution after the hydrolysis obtained in the same procedures as in Example 2 to obtain a coagulated precipitate, which was filtered and washed by a centrifugal filtration machine.

Hydrochloric acid and purified water were added to the water-washed precipitate, which was processed so that the zirconium concentration was at 30% by weight to obtain a sol.

Yttrium hydroxide was added to the sol at a 3 mol% concentration as yttria, which was dried, calcined, pulverized in a wet process and dried in the same procedures as in Example 1 to obtain fine zirconia powder.

The resultant powder was molded and sintered in the same manner as in Example 1. The resultant sintering product had a density of 6.02 g/cm$^3$ and a bending strength of 98 kgf/mm$^2$.

EXAMPLE 4

Yttrium nitrate was added by 3 mol% as yttria instead of yttrium hydroxide to a sol obtained in the same procedures as in Example 1 and concentrated, dried, calcined, pulverized in a wet process and dried in the same manner as in Example 1 to obtain fine zirconia powder.

The resultant fine zirconia powder was molded and sintered in the same procedures as in Example 1 to obtain a sintering product. The product had a density of 6.02 g/cm$^3$ and a bending strength of 100 kgf/mm$^2$.

COMPARATIVE EXAMPLE 1

An aqueous 25% ammonia solution was added for neutralization to a solution obtained after hydrolysis in the same procedures as in Example 1, to obtain a coagulated, precipitate, which was then filtered and washed by a centrifugal filtration machine.

Yttrium hydroxide, hydrochloric acid and purified water were added to the water-washed precipitate and adjusted so that the yttrium was contained by 3 mol% composition and the zirconia concentration was 30% by weight to obtain a sol.

The sol was treated in the same procedures as in Example 1 to obtain a sintering product. The product had a density of 5.72 g/cm$^2$ and a bending strength of 68 kgf/mm$^2$.

COMPARATIVE EXAMPLE 2

Yttrium nitrate was added by 3 mol% as yttria instead of yttrium hydroxide to a sol obtained in the same procedures as in Example 3 and concentrated, dried, calcined, pulverized in a wet process and dried in the same manner as in Example 1 to obtain fine zirconia powder.

Remarkable increase in the viscosity in the zirconia sol was recognized upon addition of yttrium nitrate to the zirconia sol, which was not found for the yttrium hydroxide in the Example 1 or 2 and, in addition, formation of gel was partially observed.

The resultant fine zirconia powder was molded and sintered in the same procedures as in Example 1 to obtain a sintering product. The product had a density of 5.71 g/cm$^3$ and a bending strength of 67 kgf/mm$^2$.

What is claimed is:

1. A process for manufacturing fine zirconia oxide powder, which comprises:
    preparing a zirconia sol, wherein the zirconia sol is obtained by hydrolyzing with heat an aqueous solution containing a member selected from the group consisting of zirconium salt, zirconium hydroxide and zirconia hydrate and then filtering the thus hydrolyzed aqueous solution by way of an ultra-filtration membrane,
    adding a metal hydroxide of at least one metal selected from the group consisting of calcium, magnesium, yttrium and lanthanide series elements to the zirconia sol,
    dehydrating or drying the zirconia sol containing said metal hydroxide, and
    calcining the dehydrated or dried zirconia sol to obtain fine zirconium oxide powder, wherein the zirconia sol is a sol of zirconia having a particle size of from 500 to 5000 Å.

2. A process for manufacturing fine zirconia oxide powder as defined in claim 1, wherein the zirconium salt is a member selected from the group consisting of zirconium nitrate, zirconium sulfate, zirconium oxychloride and zirconium acetate.

3. A process for manufacturing fine zirconia oxide powder as defined in claim 1, wherein the aqueous solution containing the zirconium hydroxide is an aqueous solution containing zirconium hydroxide obtained by neutralizing an aqueous solution of zirconium nitrate, zirconium sulfate, zirconium oxychloride or zirconium acetate.

4. A process for manufacturing fine zirconia oxide powder as defined in claim 1, wherein the aqueous solution containing the zirconia hydrate is an aqueous solution containing the zirconia hydrate obtained by hydrolyzing with heat an aqueous solution of a member selected from the group consisting of zirconium nitrate, zirconium sulfate, zirconium oxychloride and zirconium acetate.

5. A process for manufacturing fine zirconia oxide powder as defined in claim 1, wherein the hydrolysis with heat is applied to an aqueous solution containing a member selected from the group consisting of zirconium salt, zirconium hydroxide and zirconia hydrate in an amount from 0.1 to 5 mol/l as $ZrO_2$ at a temperature of from 20 to 300° C. for 30 minutes to 10 days.

6. A process for manufacturing fine zirconia oxide powder as defined in claim 5, wherein the hydrolysis with heat is applied to an aqueous solution containing a member selected from the group consisting of zirconium salt, zirconium hydroxide and zirconia hydrate in an amount from 0.3 to 3 mol/l as $ZrO_2$ at a temperature of from 70 to 250° C. for one hour to four days.

7. A process for manufacturing fine zirconia oxide powder as defined in claim 1, wherein the amount of metal hydroxide added to the zirconia sol is from 0.1 to 30 mol% as the oxide in stabilized zirconia.

8. A process for manufacturing fine zirconia oxide powder as defined in claim 1, wherein dehydration or drying is carried out by means of distillation, solvent extraction, or spray drying, and wherein calcining is conducted at a temperature of from 700 to 1200° C. for from 10 minutes to 24 hours.

9. A process for manufacturing fine zirconia oxide powder as defined in claim 8, wherein said calcining is conducted at a temperature of from 800 to 1100° C. for from 30 minutes to 12 hours.

* * * * *